(12) United States Patent
Conti

(10) Patent No.: US 8,460,559 B2
(45) Date of Patent: Jun. 11, 2013

(54) SWIMMING POOL RAKE AND DEBRIS CATCHER APPARATUS AND SYSTEM

(76) Inventor: Rick Conti, Martinez, GA (US)

(*) Notice: Subject to any disclaimer, the term of this patent is extended or adjusted under 35 U.S.C. 154(b) by 278 days.

(21) Appl. No.: 12/909,040

(22) Filed: Oct. 21, 2010

(65) Prior Publication Data

US 2011/0094973 A1 Apr. 28, 2011

Related U.S. Application Data

(60) Provisional application No. 61/255,078, filed on Oct. 26, 2009.

(51) Int. Cl.
*E04H 4/16* (2006.01)
*B01D 35/02* (2006.01)

(52) U.S. Cl.
CPC . *E04H 4/16* (2013.01); *B01D 35/02* (2013.01)
USPC ........... 210/776; 210/167.19; 210/471; 4/496

(58) Field of Classification Search
USPC ...... 210/776, 167.1, 167.19, 470, 471; 4/490, 4/496
See application file for complete search history.

(56) References Cited

U.S. PATENT DOCUMENTS

| | | | | |
|---|---|---|---|---|
| 4,332,683 A | * | 6/1982 | Alt | 210/499 |
| 4,481,117 A | * | 11/1984 | Collins | 210/776 |
| 5,173,181 A | * | 12/1992 | McFarland | 210/167.19 |
| 5,288,414 A | * | 2/1994 | Mongiello | 210/776 |
| 5,487,830 A | * | 1/1996 | Huppert | 210/167.19 |
| 6,398,952 B1 | * | 6/2002 | Baer | 210/167.19 |
| 6,989,093 B1 | * | 1/2006 | Greathead | 210/167.19 |
| 7,374,671 B2 | * | 5/2008 | Blake | 210/167.19 |
| 2005/0011819 A1 | * | 1/2005 | Gillen et al. | 210/169 |
| 2007/0181476 A1 | * | 8/2007 | Blake | 210/167.1 |
| 2009/0250387 A1 | * | 10/2009 | Gonzalez | 210/167.19 |

* cited by examiner

*Primary Examiner* — Christopher Upton

(57) ABSTRACT

An assembly and method for capturing debris before it enters a skimmer mechanism in a pool are described, herein. A basket filter assembly is comprised of a frame assembly, which is constructed of water- and rust-proof material that has a mesh material placed around and attached to it. The basket filter assembly is then attached to a U-shaped arm, by which it is lowered into position over the skimmer mechanism. The other end of the arm is then attached to a weighted stand such that it holds the assembly in place.

18 Claims, 3 Drawing Sheets

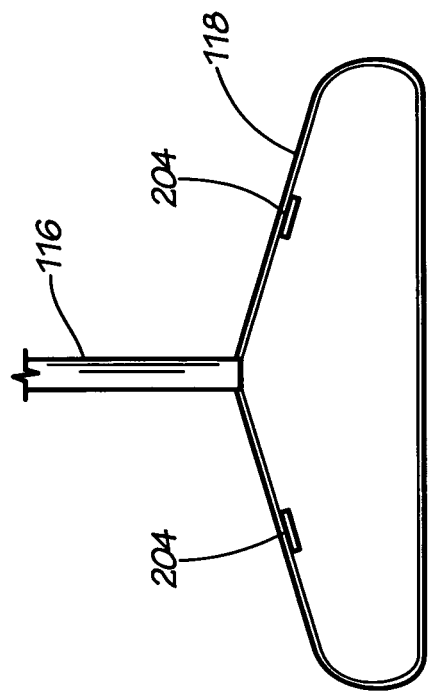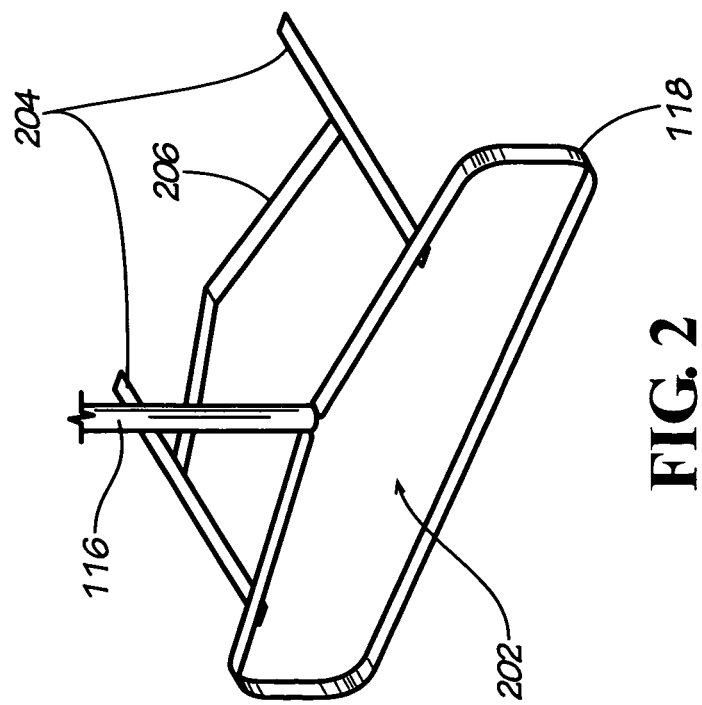
FIG. 3
FIG. 2

SWIMMING POOL RAKE AND DEBRIS CATCHER APPARATUS AND SYSTEM

RELATED APPLICATIONS

This utility application is related to, and claims priority to, U.S. Provisional Patent Application No. 61/255,078, filed on Oct. 26, 2009 and entitled SKIMMER BASKET ASSISTANT.

BACKGROUND OF THE INVENTION

1. Field of the Technology

This invention relates, generally, to the field of swimming pool cleaning and purification devices. More specifically, the invention relates to an attachment to a pool equipment stand currently available on the market as a first level of protection for a pool skimmer to avoid significant build-up of trash and debris.

2. Background

The cleaning and pool drain systems of most "in-ground" pools operate in basically the same way. In order to remove dirt, debris, and other contaminates, pool water must circulate through a filtering system. During normal operation, water flows to the filtering system through at least one drain located on the bottom of a pool and through at least one skimmer drain, usually multiple, around the top of the pool.

The skimmers draw in water from the top of the pool in order to catch any floating debris or trash, such as leaves, hair, sunscreen oil or lotion, etc. . . . A skimmer may or may not be designed with a small door at its inlet that opens and closes at a set interval, only allowing a very small volume of water to enter at a time, thus only "skimming" the top layer of water. As the water is pulled through the inlet and into a suction line leading to the filter and pump, it is pulled through a strainer basket located within the skimmer. The strainer basket is meant to catch large pieces of debris such as bark, twigs, leaves, or other large particulates that would damage the pump if allowed to filter through it. The strainer basket may be removed periodically via a hatch in the pool deck to be emptied and cleaned.

The necessary cleaning may be delayed, however, if the owner must leave the pool unattended such as when on vacation or away for extended periods of time. Also, in the event of severe storms or other occurrences, a pool can be filled with leaves, trash, or other debris before the owner has a chance to clean it him or herself. In such a situation, the filter basket may fill up with debris before being emptied and can cause not only an unsanitary situation, but it may also back up and cause a problem with the filtration system.

The invention, described in more detail below, provides an apparatus that may be placed in front of a skimmer opening to catch the debris before it enters the skimmer and strainer basket when the owner is going to be away and not able to clean the basket over long periods of time. Such a unit, in accordance with an embodiment of the invention may include a netting mechanism attached to a frame that will substantially fit in front of the periphery of a skimmer opening.

In accordance with and embodiment of the present invention, a skimmer basket assembly is provided, comprising: a U-shaped support arm; a pocket comprised of a mesh basket; and a frame assembly such that said pocket is supported by and attached to said frame assembly.

A further embodiment of the present invention is also provided, wherein said U-shaped support arm is comprised of at least one attachment arm, at least one swing arm, and at least one elbow joint.

A further embodiment of the present invention is also provided, wherein said connection arm has alignment holes disposed thereon.

A further embodiment of the present invention is also provided, wherein said frame assembly is further comprised of a generally rectangularly shaped frame, at least one support spine attached to said frame, and at least one support rib attached to said support spine.

A further embodiment of the present invention is also provided, wherein said frame assembly is further comprised of a basket frame pipe.

A further embodiment of the present invention is also provided, wherein said pocket covers and is attached to said frame.

A further embodiment of the present invention is also provided, wherein said basket frame pipe is engagingly attached to said U-shaped arm.

A further embodiment of the present invention is a method for trapping debris from a pool skimmer, comprising providing a skimmer basket assembly, comprising: a U-shaped support arm; a pocket comprised of a mesh basket; and a frame assembly such that said pocket is supported by and attached to said frame assembly; wherein, said skimmer basket assembly is aligned at the water level even with a pool skimmer opening.

A further embodiment of the present invention is also provided, wherein said skimmer basket assembly is engagingly attached to said U-shaped arm.

A further embodiment of the present invention is also provided, wherein said U-shaped arm is engagingly attached to a weighted stand.

A further embodiment of the present invention is also provided, wherein said U-shaped support arm is comprised of at least one attachment arm, at least one swing arm, and at least one elbow joint.

A further embodiment of the present invention is also provided, wherein said connection arm has alignment holes disposed thereon.

A further embodiment of the present invention is also provided, wherein said frame assembly is further comprised of a generally rectangularly shaped frame, at least one support spine attached to said frame, and at least one support rib attached to said support spine.

A further embodiment of the present invention is also provided, wherein said frame assembly is further comprised of a basket frame pipe.

A further embodiment of the present invention is also provided, wherein said pocket covers and is attached to said frame.

BRIEF DESCRIPTION OF THE DRAWINGS

FIG. 2 is a rendering of the frame of an embodiment of the invention without the capture netting, but showing how the netting attaches to and is supported by the frame of the embodiment of the invention.

FIG. 3 is a front view of an embodiment of the invention.

DETAILED DESCRIPTION OF EXEMPLARY EMBODIMENTS

Figure 1:
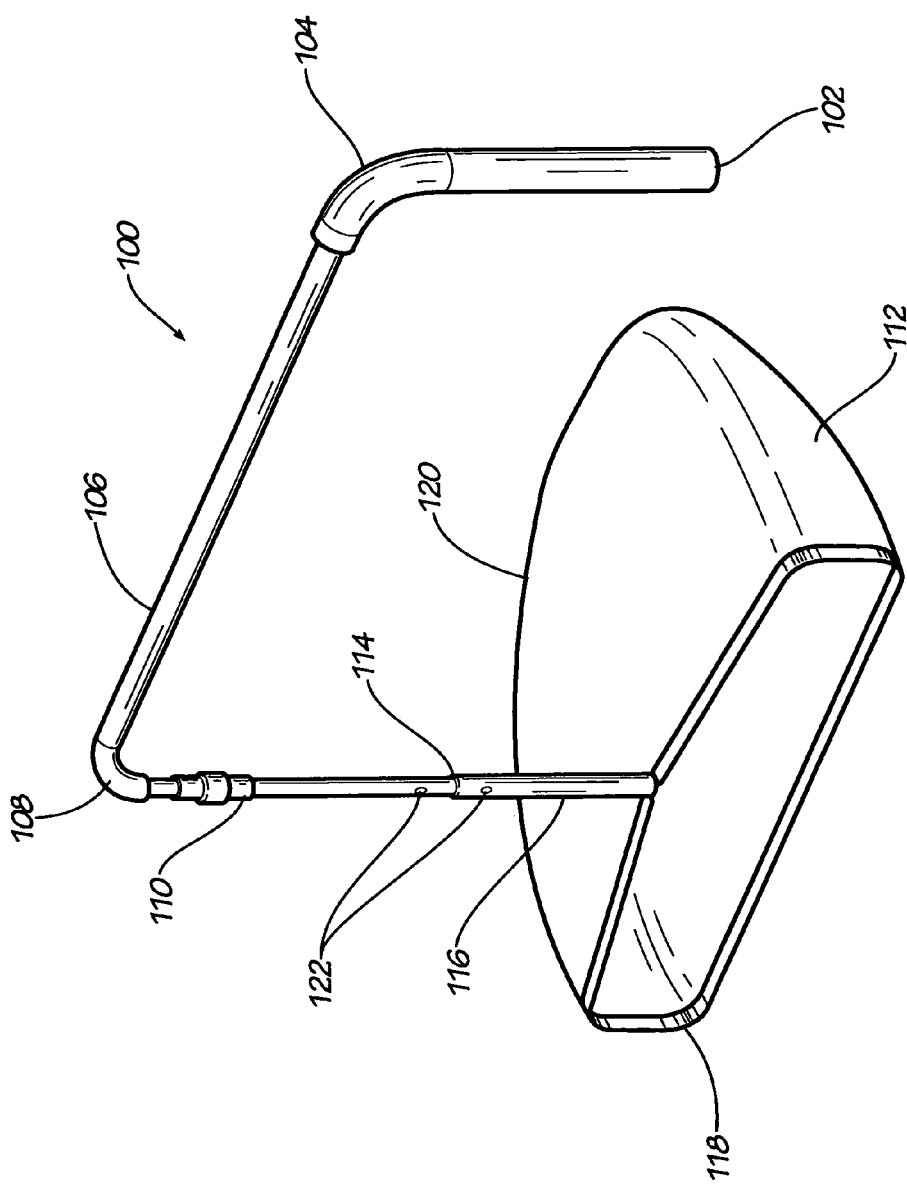
FIG. 1 shows a view of an embodiment of the invention.

Turning now to the drawings, where like numbers represent like description, herein, it will be understood by one of ordinary skill inn the art that this description is made for the purposes of illustration, only, and is not intended to be limiting in any way. FIG. 1 is a rendering of an embodiment of the invention. It is composed of a generally U-shaped arm 100, which may be constructed and formed of a pipe of any sort of water-resistant material. A stabilizing stand end of the arm 102 attaches to a standardized umbrella or other pool equipment stand. Connected to the stabilizing arm 102 is an elbow joint 104, which provides a connection to the swing arm 106. The swing arm 106 may be composed of multiple pipe sections, such as a second elbow joint 108. The second elbow joint 108 connects to a pipe assembly 110, which facilitates attachment to the skimmer basket 112. The skimmer basket end, or attachment arm 114, attaches to a pipe 116, that is part of the skimmer basket frame rim 118. The skimmer basket 120 is composed primarily of a netting pocket made of netting sized that debris and large particulate matter such as leaves, trash, sticks, insects, acorns, etc, may not pass through the openings in the netting 120. The skimmer basket frame pipe 116 connection to the attachment arm 114 may be adjustable such that either the skimmer basket pipe 116 or the attachment arm 114 may fit and slide into the other and be secured via alignment holes 122. Therefore, the skimmer basket 112 may be set at varying heights.

FIG. 2 is a rendering of the frame of an embodiment of the invention. The frame rim 118 forms a generally pentagonal opening 202 with pitched upper sides composed of metallic, plastic, or other water- and rust-proof material. It will be understood by one of ordinary skill in the art that the material will preferably be lightweight and able to be lifted and maneuvered into place with ease and require very little strength to accomplish. It will be further understood by one of ordinary skill in the art that although the described embodiment has a generally pentagonal shaped opening 202, any shape opening, such as rectangular, octagonal, hexagonal, or other shape, may be used and is only shown for exemplary purposes and not as a limitation. Attached perpendicularly and vertically to the opening 202 frame rim 118 is the skimmer basket frame pipe 116. Horizontally attached to the upper sides of the frame rim 118 are spines 204, which extend away from the frame rim 118. The spines may be constructed of the same material as the frame or of another similarly lightweight and water- and rust-proof material. It will be understood by one of ordinary skill in the art that although two spines are depicted in the instant embodiment, any number of spines may be used and this description is not meant for purposes of limitation, but as an example, only. Perpendicular to and attached between the spines 204 is a pitched rib 206 included to support the spines 204. The rib 206, in the depicted embodiment of the invention, may be bent and pitched such that its sides are perpendicular to the upper sides of the frame rim 118.

It will be understood that the structure described herein may be accomplished by varying arrangements and number of spines 204 and ribs 206 or by other methods not herein described yet equivalent and therefore included in this specification. This description and the drawings filed herewith that they described are meant only for the purposes of example and not for limitation.

FIG. 3 is a drawing of the front view of the frame rim 118 of an embodiment of the invention. FIG. 3 shows the general shape of an embodiment of the invention. Also shown is the skimmer basket frame pipe 116 and the ends of the spines 204.

Figure 4:
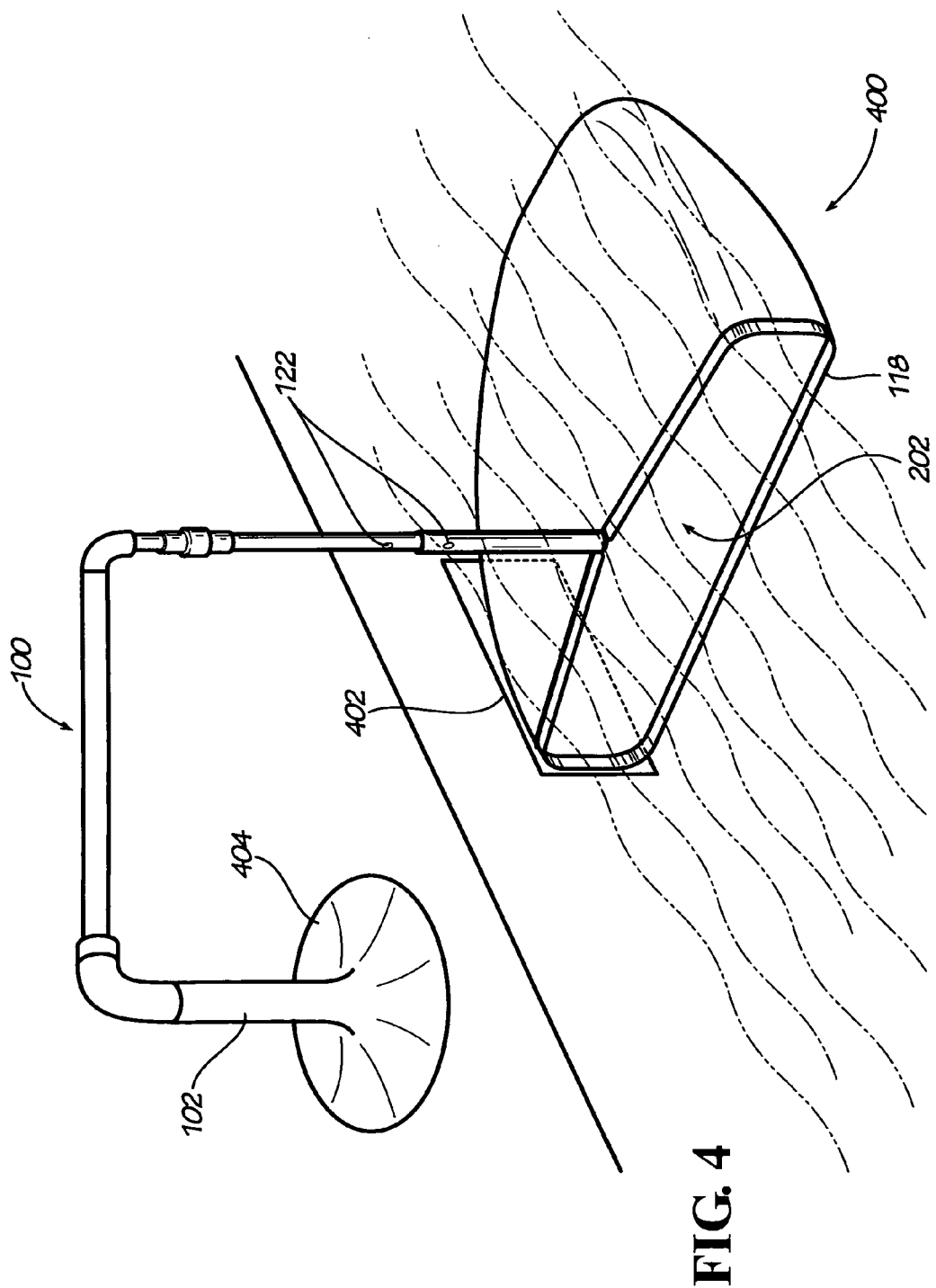
FIG. 4 is a rendering of an embodiment of the invention in operation in front of a pool skimmer and attached to an umbrella or other pool equipment stand.

FIG. 4 shows and embodiment of the invention in use. The skimmer basket assembly 400 is lowered into the pool at the water level substantially even with the skimmer opening 402.

The skimmer basket assembly 400 is placed in front of the skimmer opening 402 such that the frame rim 118 and opening 202 are aligned vertically and perpendicular to the skimmer opening 402. In such an arrangement, the skimmer basket assembly 400 may capture and accumulate much heavy debris before it enters the skimmer. The basket assembly 400 is attached to the U-shaped arm 100 and may be adjusted to the necessary height by the alignment holes 122. The skimmer basket assembly 400 is held in place via a prior art weighted stand 404, such as that used to hold a pool umbrella in place, attached via the stabilizing arm 102 section of the U-shaped arm 100. Such a stand 404 may be plastic or other material, which may be filled with water or sand or any substance to hold it in place. Such a stand 404 may also be made of iron or other heavy metal. One of ordinary skill in the art will understand that such a stand may be made of any material and any shape such that it is sufficiently heavy, or may be made so, such that it can hold the skimmer basket assembly in place in the upper level of water. One of ordinary skill in the art will understand that such a stabilizing stand 404 has a standardized attachment and engagement mechanism to which the stabilizing arm 102 may attach.

It will be understood by one of ordinary skill in the art that the above-described embodiment of the invention is for purposes of explanation, only, and is not intended as limiting this invention to the embodiment described herein. It will be understood that the embodiment described may be constructed of multiple materials so long as they are water- and rust-proof and are of such weight that they require no special handling. It will also be understood that the construction of the U-shaped arm 100 described herein is simply one embodiment and for illustration, only, such that it may be constructed by any method and number and types of separate pieces, so long as the basket assembly 400 may be stably positioned at a water level and in front of skimmer 402.

What is claimed is:

1. A skimmer basket assembly, comprising:
    a U-shaped support arm comprised of an attachment arm, a swing arm, and a stabilizer arm, wherein said attachment arm has alignment holes disposed thereon;
    a pocket comprised of mesh basket; and
    a frame assembly comprised of:
        an opening defined by a frame rim;
        at least one support spine attached to said frame rim;
        at least one support rib attached to said at least one support spine; and
        a basket frame pipe extending from said frame rim;
    wherein said pocket is supported by and attached to said frame assembly and said basket frame pipe adjustably connects said frame assembly to said attachment arm via said alignment holes.

2. The skimmer basket assembly of claim 1, wherein the height of said frame assembly is adjustable using said alignment holes.

3. The skimmer basket assembly or claim 1, wherein said pocket covers said frame assembly.

4. The skimmer basket assembly of claim 1, wherein said basket frame pipe is attached to said frame rim perpendicularly and vertically to said opening.

5. The skimmer basket assembly of claim 1, wherein said at least one support spine is horizontally attached to an upper side of said frame rim and extends away from said frame rim.

6. The skimmer basket assembly of claim 1, wherein said at least one support rib is perpendicularly attached to said at least one support spine.

7. The skimmer basket assembly of claim 1, wherein said stabilizer arm is engagingly attached to a weighted stand.

8. A method for trapping debris from a pool skimmer, comprising:
  providing a skimmer basket assembly, comprising:
    a U-shaped support arm comprised of an attachment arm, a swing arm, and a stabilizer arm, wherein said attachment arm has alignment holes disposed thereon;
    a pocket comprised of a mesh basket; and
    a frame assembly comprised of an opening defined by a frame rim, at least one support spine attached to said frame rim, at least one support rib attached to said at least one support spine, and a basket frame pipe extending from said frame rim;
    wherein said pocket is supported by and attached to said frame assembly and said basket frame pipe adjustably connects said frame assembly to said attachment arm via said alignment holes; and
  aligning said frame assembly at the water level of a pool even with a pool skimmer opening.

9. The method for trapping debris described in claim 8, wherein said U-shaped arm is engagingly attached to a weighted stand.

10. The method for trapping debris described in claim 8, wherein the height of said frame assembly is adjustable using said alignment holes.

11. The method for trapping debris described in claim 8, wherein said pocket covers said frame assembly.

12. The method for trapping debris described in claim 8, further comprising vertically and perpendicularly aligning said frame rim and said opening with said pool skimmer opening.

13. The method for trapping debris described in claim 8, wherein said basket frame pipe is attached to said frame rim perpendicularly and vertically to said opening.

14. The method for trapping debris described in claim 8, wherein said at least one support spine is horizontally attached to an upper side of said frame rim and extends away from said frame rim.

15. The method for trapping debris described in claim 8, wherein said at least one support rib is perpendicularly attached to said at least one support spine.

16. A skimmer basket assembly, comprising:
  a U-shaped support arm comprising an attachment arm, a swing arm, and a stabilizer arm, wherein said attachment arm has alignment holes disposed thereon;
  a pocket comprised of a mesh basket; and
  a frame assembly comprising:
    a frame rim defining an opening;
    at least two support spines horizontally attached to an upper side of said frame rim and extending away from said frame rim;
    at least one support rib perpendicularly attached to said at least two support spines; and
    a basket frame pipe attached to said frame rim perpendicular and vertical to said opening;
  wherein said pocket is supported by and attached to said frame assembly and said basket frame pipe adjustably connects said frame assembly to said attachment arm via said alignment holes.

17. The skimmer basket assembly of claim 16, wherein said stabilizer arm is engagingly attached to a weighted stand.

18. The skimmer basket assembly of claim 16, wherein the height of said frame assembly is adjustable using said alignment holes.

* * * * *